United States Patent
Felstaine et al.

(10) Patent No.: US 10,162,725 B1
(45) Date of Patent: Dec. 25, 2018

(54) SYSTEM, METHOD, AND COMPUTER PROGRAM FOR PROVIDING FEEDBACK INDICATING AN IMPACT OF USER DIRECTIVES ON A SOFTWARE SYSTEM

(71) Applicant: Amdocs Development Limited, Limassol (CY)

(72) Inventors: Eyal Felstaine, Hertzeliya (IL); Ofer Hermoni, Yavne (IL); Itzik Kitroser, Beer Sheva (IL); Shmuel Ur, Shorashim (IL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 217 days.

(21) Appl. No.: 15/275,189

(22) Filed: Sep. 23, 2016

(51) Int. Cl.
*G06F 11/30* (2006.01)
*G06F 11/34* (2006.01)

(52) U.S. Cl.
CPC ........ *G06F 11/3079* (2013.01); *G06F 11/302* (2013.01); *G06F 11/3006* (2013.01); *G06F 11/3409* (2013.01)

(58) Field of Classification Search
CPC .................................................. G06F 11/3079
See application file for complete search history.

(56) References Cited

U.S. PATENT DOCUMENTS

2016/0291937 A1\* 10/2016 Khanna ................. G06F 3/0482

\* cited by examiner

*Primary Examiner* — Manuel A Rivera Vargas
(74) *Attorney, Agent, or Firm* — Zilka-Kotab, P.C.

(57) ABSTRACT

A system, method, and computer program product are provided for providing feedback indicating an impact of user directives on a software system. In use, user input associated with a software system is received. Additionally, an impact of the user input on the software system is determined. Further, feedback is provided indicating the impact of the user input on the software system.

11 Claims, 12 Drawing Sheets

US 10,162,725 B1

SYSTEM, METHOD, AND COMPUTER PROGRAM FOR PROVIDING FEEDBACK INDICATING AN IMPACT OF USER DIRECTIVES ON A SOFTWARE SYSTEM

FIELD OF THE INVENTION

The present invention relates to telecommunications and/or data communications and more particularly to network function virtualization (NFV) of telecommunications networks.

BACKGROUND

Network Function Virtualization (NFV) is a term or a name of a proposed architecture of telecom services as published by the European Telecommunications Standards Institute (ETSI) in a series of documents available from the ETSI website. NFV uses generic hardware platform and software adapted for the generic hardware platform. Thus, NFV creates a network much more flexible and dynamic than a legacy communication network. In NFV-based networks, a Virtual Network Function (VNF) decouples the software implementation of the network function from the infrastructure resources it runs on by virtualization. A network service is based on one or more VNFs and/or Physical Network Functions (PNFs), their interconnections, and chaining definitions. The VNFs can be executed on almost any generic hardware processing facility. Therefore, VNFs may be installed, removed, and moved between hardware facilities, much more easily, less costly and thus, more frequently.

The flexibility of the NFV-based network enhances the means available for optimizing the network's capacity and performance. However, current techniques for providing feedback associated with user inputs to such networks are limited.

There is thus a need for addressing these and/or other issues associated with the prior art.

SUMMARY

A system, method, and computer program product are provided for providing feedback indicating an impact of user directives on a communication network. In use, user input associated with a communication network is received. Additionally, an impact of the user input on the communication network is determined. Further, feedback is provided indicating the impact of the user input on the communication network.

DETAILED DESCRIPTION

Figure 1:
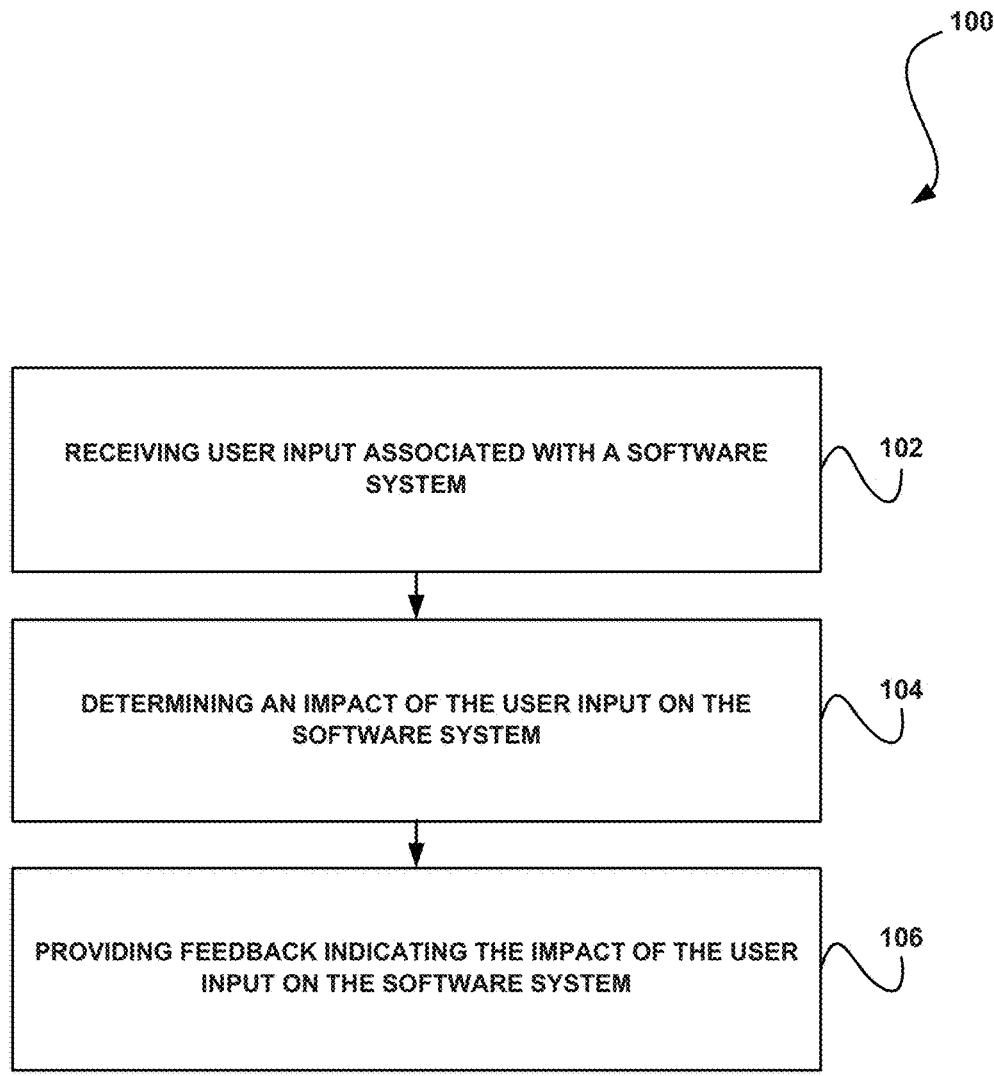
FIG. 1 illustrates a method for providing feedback indicating an impact of user directives on a software system, in accordance with one embodiment.

FIG. 1 illustrates a method 100 for providing feedback indicating an impact of user directives on a software system, in accordance with one embodiment.

As shown, user input associated with a software system is received. See operation 102. The software system may include various types of software systems or communication networks, such as a physical network, a Network Function Virtualization (NFV) based network, and a hybrid NFV/physical based network.

The user input may include any user input to the software system. For example, the user inputs may include user directives associated with the network.

For example, an administrator may personally give feedback or directives to the software system. As examples, the directions can be very direct (e.g. directives to buy more systems/components, move cloud providers, etc.), or the feedback may be less direct, to be used in conjunction with other observations (e.g. such as, to expect load increases, expect DDOS attacks, informing of price changes, suggesting configurations, etc.).

Additionally, an impact of the user input on the software system is determined. See operation 104. Further, feedback is provided indicating the impact of the user input on the software system. See operation 106. The feedback may be provided in real-time, near real-time, and/or on-demand, etc. Moreover, the feedback may be presented in a graphical format (e.g. utilizing one or more user interfaces), text format, and/or in any form desired by a user.

In one embodiment, providing the feedback indicating the impact of the user input on the software system may include providing feedback indicating how the user input impacted the software system and/or one or more possible alternative user inputs to be given. In another embodiment, providing the feedback indicating the impact of the user input on the software system may include providing feedback indicating when the user input directives caused no action.

For example, in the case that the feedback indicates how the user input impacted the software system and/or one or more possible alternative user inputs to be given, the user input may have included one or more directives. In this case, determining the impact of the user input on the software system may include analyzing one or more key performance indicators (KPIs) associated with the software system. The key performance indicators may include any type of key performance indicator associated with the software system.

In one embodiment, analyzing the key performance indicators may include comparing the key performance indicators in at least one first scenario implementing the user input and in at least one second scenario not implementing the user input. In this case, when the user input is received, the first scenario implementing the user input and the second scenario not implementing the user input may be run in parallel. In one embodiment, information associated the first scenario and the second scenario running in parallel may be displayed. This may include displaying the key performance indicators and indicating where there are differences between the key performance indicators in the first scenario and the second scenario. In one embodiment, when additional user input is received, at least one third scenario implementing the additional user input may be created and run in parallel (e.g. and displayed) with the first scenario and the second scenario.

Additionally, in another embodiment, analyzing the key performance indicators may include running a plurality of simulations, where each of the simulations are implementing different actions associated with the user input. In this case, the key performance indicators associated with each of the plurality of simulations may be compared to determine the impact of the user input on the software system.

In the case that providing feedback includes providing feedback indicating that the user input directives caused no action, in one embodiment, this may include indicating that a common action would be implemented regardless of whether the user input was received or the user input was not received. Further, in one embodiment, providing the feedback may include providing feedback indicating the user input caused no action because there was nothing useful that the software system could do based on the user input. In another embodiment, providing the feedback may include providing feedback indicating the user input caused no action because the software system independently addressed issues associated with the user input.

Additionally, in one embodiment, providing the feedback may include providing feedback on usefulness of directives for training what-if scenarios. In another embodiment, providing the feedback may include providing feedback on usefulness of directives associated with historical data.

Still yet, in one embodiment, determining the impact of the user input on the software system may include comparing a result of executing at least one first scenario utilizing the user input and a result of executing a second scenario without utilizing the user input. In another embodiment, determining the impact of the user input on the software system may include utilizing a saved log of at least a portion of a system execution and at least one simulation of at least a portion of a system execution.

Complex systems such as NFV-based communication networks are governed in very complex ways. Software uses pattern matching, rules, and historical data to optimize its behavior. For example, when traffic increases, the system may need to purchase additional resources, such as machines on the cloud or more bandwidth. Another example is that when the geography of the traffic shifts (e.g., from U.S. to Europe, etc.) it may be desirable to switch the location of cloud computation to speed up and reduce the cost of the traffic. Yet another example is when the cost of the cloud depends on the time of day and off-line traffic is directed to off peak cost times.

In some cases, decisions may be based on pattern matching, in which detecting a pattern may suggest an action. In other cases, the decisions may be based on thresholds, such as when a specific load is detected, some action is taken.

Decisions may also be based on rules, such as what to do in the morning or evening depending on cloud cost structure and on predictions based on historical data that suggests, for example, what to do in specific times of the month or the day.

In many such complex systems/networks, administrators can personally give feedback or directives to the system/network. The direction may be very direct, such as a directive to buy more systems, or move cloud providers, etc. The feedback may also be less direct, to be used in conjunction with other observations, such as to expect certain loads, expect DDOS attacks, inform of price changes, suggesting configurations, etc.

In the context of NFV-based communication networks, an administrator may order to scale out a service, however, the service may have scaled out regardless, for a particular reason (e.g. an overloaded CPU, etc.). As another example, if an administrator has input on a storm that is expected to hit in a first city, the administrator may indicate a preference of systems in a second city to handle services from systems in the first city. If there is a power outage, the administrator may indicate a preference for using systems in a third city (or center) for specific services and to use the power generator for others.

As another example, an administrator may change service priority, such that one service is preferred over another service (e.g. this may affect the resources that each service can allocate, etc.).

Additionally, the administrator may want to change values in an application level, such as increasing a sensitivity of a security parameter. As the administrator cannot change the application values, it may change an indicator (e.g. in this case expect threat).

The system/network may take the user suggestions and direction together with its own pattern matching, rules, thresholds and other controls and decide based on all of that criteria what to do.

It may be far from trivial for the user to understand how directives impacted the system. However, a special case of specific importance is for the user to know if the directives had no impact. Also, it is desirable that the user is able to determine how did a directive impacted a KPI. It is also desirable for the user to determine the best time to give a directive to have the best impact on the KPI. The method 100 provides a mechanism to provide a user with this valuable information.

In the context of the present description, the terms "network" and "communication network" refer to the hardware and software connecting one or more communication elements including wireline networks, wireless networks, and/or combinations thereof.

The terms "network function virtualization" (NFV) and virtual network function (NFV) are described in a series of documents published by the European Telecommunications Standards Institute (ETSI) and available from the ETSI website. The term "virtual network function or feature" (VNF) refers to a particular implementation of a function, a feature, or a service provided by the network, internally within the network, or externally to a customer, subscriber, end-user, a terminal or a server. A VNF may include the software program implementation of the function or feature or service. The term VNF instance (VNF-I) refers to a particular process or task executing the VNF program by a particular virtual machine or processor or computing facility and/or used by a particular customer (or subscriber, end-user, terminal or server, etc.).

The term "service" refers to any type of use (such as a use case) that a NFV-based communication network may offer or provide to one or more communication elements. A service may include switching data or content between any number of elements, providing content from a server to a communication element or between servers, securing and protecting communication and content, processing content provided by the customer or by a third party, providing backup and redundancy, etc. A service may be using partial functionality of a VNF or may include one or more VNFs and/or one or more VNF instances forming a service sub-network (or interconnection model). In the context of the present description, the term "chain" may refer to such service sub-network, such as a particular plurality of VNFs and/or VNF instances associated with a particular service type or a service instance.

The term "deployment", when referring to hardware elements, including processing elements, memory elements, storage elements, connectivity (communication) elements, etc., refer to the configuration or topology of these hardware elements creating the NFV-based network. The term "deployment", when referring to software elements, such a VNFs and VNF instances, refers to the association between such software elements and hardware elements.

The term "deployment optimizations" refers to association of software and hardware elements in a manner that satisfies a particular set of requirements and/or rules, such as load-related and performance-related requirements, or a manner that makes a better use of a particular hardware deployment, such as by reducing operational cost.

The terms "service deployment optimization", or "service optimization" or "chain optimization" refer to optimizing the deployment of a service chain, i.e., optimizing the deployment of one or more VNF instances making a particular service. The terms chain optimization and service optimization may thus be used interchangeably.

The term "session" refers to a communication connection between two or more entities that persists for a period of time during which data may be exchanged there between. A session may be implemented and managed by a session layer in the corresponding network protocol. The term session may include a network session and a logical session. The network session may be associated with the devices used to communicate, while the logical session may be associated with the communicating parties (users) and may persist regardless of the communication means that the parties are using.

The term "service continuity" includes and applies to the terms "session continuity" and "streaming continuity". Streaming refers to streaming media, session or service, such as sound (including voice), video, multimedia, animation, etc. The term service usually applies to a group of VNFs (or the functionality provided by the group of VNFs) but may also apply to a single VNF (or the functionality provided by the VNF). The term "continuity" indicates that the session or the service is not interrupted, or that an interruption is short enough that a user is not aware of such interruption, or that the interruption does not cause any loss of data, or that the loss is handled in acceptable manner (e.g. a few packets of speech lost, but the conversation can continue, etc.).

The term "availability" or "service availability" refers to a level of the service, or a characteristic of the service, in which the service provider should provide the service, albeit possible hardware or software faults. For example, the service provider may obligate to the customer to provide a particular level of processing power, communication features such as bandwidth, latency, and jitter, database consistency, etc. Such level or characteristic of the service should be available to the customer even when a hardware component or a software component providing the service do not function properly. Providing availability may therefore require additional resources such as backup resources and/or mirroring. Hence "availability" may also refer to the terms "fault recovery" and "redundancy".

The term "fault recovery" refers to the process of recovering one or more of the network's services, functions, and features after a fault, whether caused by a hardware malfunction, a system crash, a software bug or a security breech or fault. A hardware malfunction includes, but is not limited to, any type of inadequate performance associated with, for example, power supply, processing units, memory, storage, transmission line, etc. The term "fault recovery" also applies to recovering the functionality of one or more VNFs or VNF instances with respect to any of the above. The terms security breech or security fault may be used interchangeably.

The term "redundancy" refers to any type of component of the network that is fully or partly duplicated, provided in standby mode, or otherwise available, to replace another component of the network when that other component stops functioning properly or otherwise indicates some kind of fault. Redundancy may apply, but is not limited to, hardware, software, data and/or content.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

The principles and operation of a system, method, and computer program product for providing feedback indicating an impact of user directives on a communication network according to various embodiments may be further understood with reference to the following drawings and accompanying description.

Figure 2:
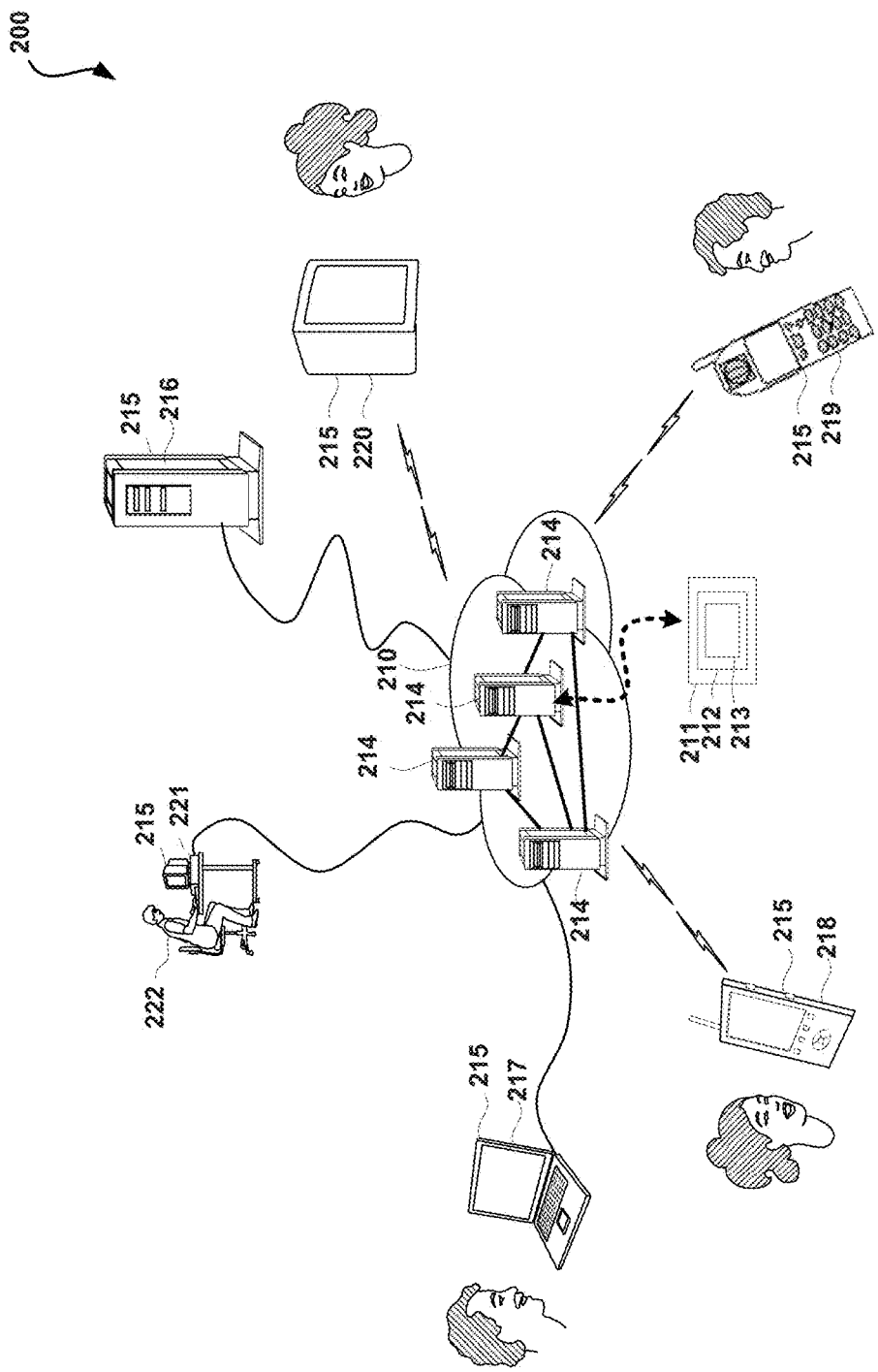
FIG. 2 illustrates a simplified diagram of a system associated with an NFV-based communication network, in accordance with one embodiment.

FIG. 2 illustrates a simplified diagram of a system 200 associated with an NFV-based communication network 210, in accordance with one embodiment. As an option, the system 200 may be implemented in the context of the details of FIG. 1. Of course, however, system 200 may be implemented in the context of any desired environment. Further, the aforementioned definitions may equally apply to the description below.

As shown in FIG. 2, at least one NFV-based network 210 is provided. The NFV-based communication network 210 includes an NFV management system 2111, an NFV-orchestration (NFV-O) module 212, and a feedback module 213, according to one embodiment.

In the context of the present network architecture, the NFV-based network 210 may take any form including, but not limited to a telecommunications network, a local area network (LAN), a wireless network, a wide area network (WAN) such as the Internet, peer-to-peer network, cable network, etc. While only one network is shown, it should be understood that two or more similar or different NFV-based networks 210 may be provided.

The NFV-based network 210 may include one or more computation facilities 214, each including one or more hardware units and being interconnected by communication links to form the NFV-based network 210. At least one of the computation facilities 214 may include the NFV management system 211. The NFV management system 211 may include the NFV-O module 212 and the feedback module 213.

The NFV-O module 212 may be executed by one or more processors, or servers, such as computation facilities 214, of the NFV-based network 210. The NFV-O module 212 may be executed as an NFV-O instance or component. The NFV-O module 212 may therefore include a plurality of NFV-O instances or components as will be further explained below.

The feedback module 213 may be a part or a component of the NFV-O module 212. However, the feedback module 213, the NFV-O module 212 and the NFV management system 211 may be separate software programs provided by different vendors. In one embodiment, the NFV-based network 210 may even have a plurality of any of the NFV management systems 211, the NFV-O modules 212, and/or the feedback module 213.

A plurality of devices 215 are communicatively coupled to the NFV-based network 210. For example, a server computer 216 and a computer or terminal 217 may be coupled to the NFV-based network 210 for communication purposes. Such end-user computer or terminal 217 may include a desktop computer, a lap-top computer, a tablet computer, and/or any other type of logic or data processing device. Still yet, various other devices may be coupled to the NFV-based network 210 including a personal digital assistant (PDA) device 218, a mobile phone device 219, a television 220 (e.g. cable, aerial, mobile, or satellite television, etc.) 2, etc. These devices 215 may be owned and/or operated by end-users, subscribers and/or customers of the NFV-based network 210. Others of the devices 215, such as administration station 221, may be owned and/or operated by the operator of the NFV-based network 210.

A network administrator 222 may supervise at least some aspects of the operation of the NFV-based network 210 by controlling an NFV infrastructure including the NFV management system 211, the NFV-O 212, and the feedback module 213.

Figure 3:
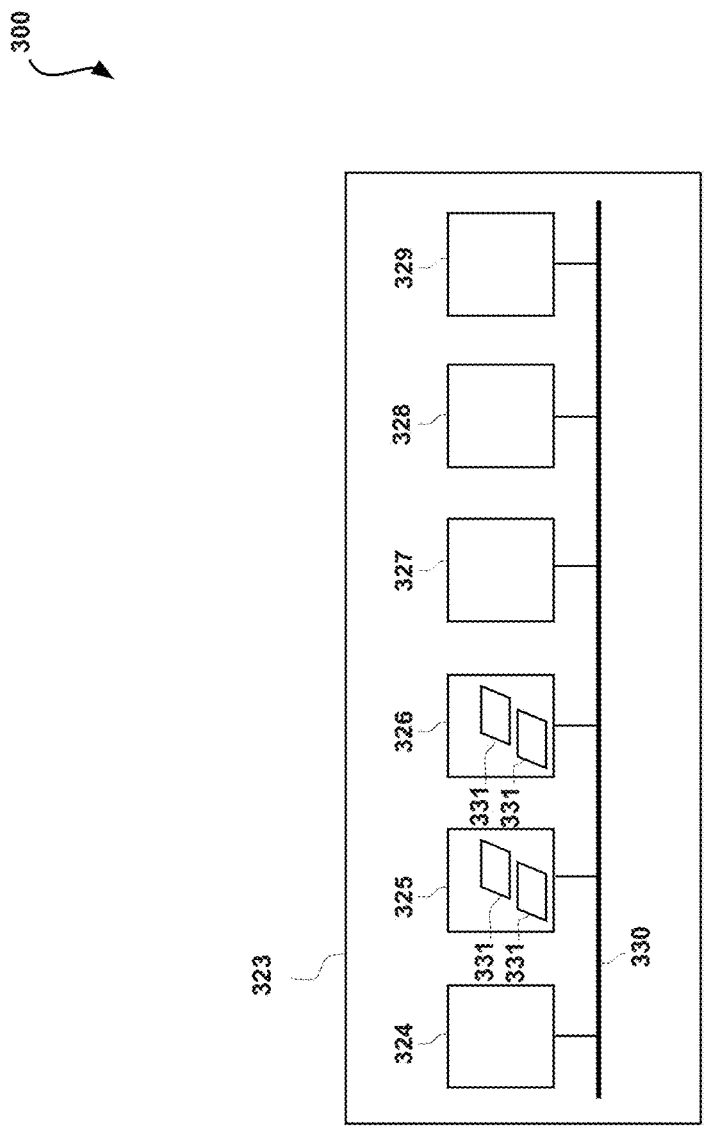
FIG. 3 illustrates a simplified block diagram of a hardware unit of an NFV-based network, in accordance with one embodiment.

FIG. 3 illustrates a simplified block diagram 300 of a hardware unit 323 of an NFV-based network, in accordance with one embodiment. As an option, the block diagram 300 may be viewed in the context of the details of the previous Figures. Of course, however, block diagram 300 may be viewed in the context of any desired environment. Further, the aforementioned definitions may equally apply to the description below.

In one embodiment, the hardware unit 323 may represent a computing facility 214 of FIG. 2, or a part of a computing facility 214. The hardware unit 323 may include a computing machine. The term computing machine relates to any type or combination of computing devices, or computing-related units, including, but not limited to, a processing device, a memory device, a storage device, and/or a communication device.

The hardware unit 323 may therefore be a network server, and the computing facility 214 may be a plurality of network servers, or a data-center, including cloud-based infrastructure. As an option, the hardware unit 323 may be implemented in the context of any of the devices of the NFV-based network 210 of FIG. 2 and/or FIG. 5 and in any desired communication environment.

Each hardware unit 323 (or computing machine, computing device, computing-related unit, and/or hardware component, etc.), including each communication link between such hardware units, may be associated with one or more performance type and a respective performance rating or value, where the hardware unit and/or communication link is operative to provide the performance value. Performance types are, for example, processing power, cash memory capacity, regular memory capacity (e.g. RAM, dynamic, or volatile memory, etc.), non-volatile memory (e.g. such as flash memory, etc.) capacity, storage capacity, power, cooling, bandwidth, bitrate, latency, jitter, bit error rate, and packet loss, etc. Virtual machines may run on top of the hardware unit 323 and a VNF may be run on one or more of such virtual machines.

The hardware unit 323 may be operative to provide computing infrastructure and resources for any type and/or instance of software component executed within the NFV-based network 210 of FIG. 2. In this regard, the hardware unit 323 may be operative to process any of the processes described herein, including but not limited to, any NFV-related software component and/or process. The hardware unit 323 is operative to process virtual network functions (VNFs), VNF instances, network function virtualization orchestration (NFV-O) software, modules and functions, data center management software, and/or cloud management systems (CMS), etc.

In various embodiments, the hardware unit 323 may include at least one processor unit 324, one or more memory units 325 (e.g. random access memory (RAM), a non-volatile memory such as a Flash memory, etc.), one or more storage units 326 (e.g. including a hard disk drive and/or a removable storage drive, representing a floppy disk drive, a magnetic tape drive, a compact disk drive, etc.), one or more communication units 327, one or more graphic processors 328 and displays 329, and one or more communication buses 330 connecting the various units/devices.

The hardware unit 323 may also include one or more computer programs 331, or computer control logic algorithms, which may be stored in any of the memory units 325 and/or storage units 326. Such computer programs, when executed, enable the hardware unit 323 to perform various functions (e.g. as set forth in the context of FIG. 1, etc.). The memory units 325 and/or the storage units 326 and/or any other storage are possible examples of tangible computer-readable media.

It is appreciated that computer program 331 may include any of the NFV management system 211, the NFV-O 212, and/or the feedback module 213 of FIG. 2.

Figure 4:
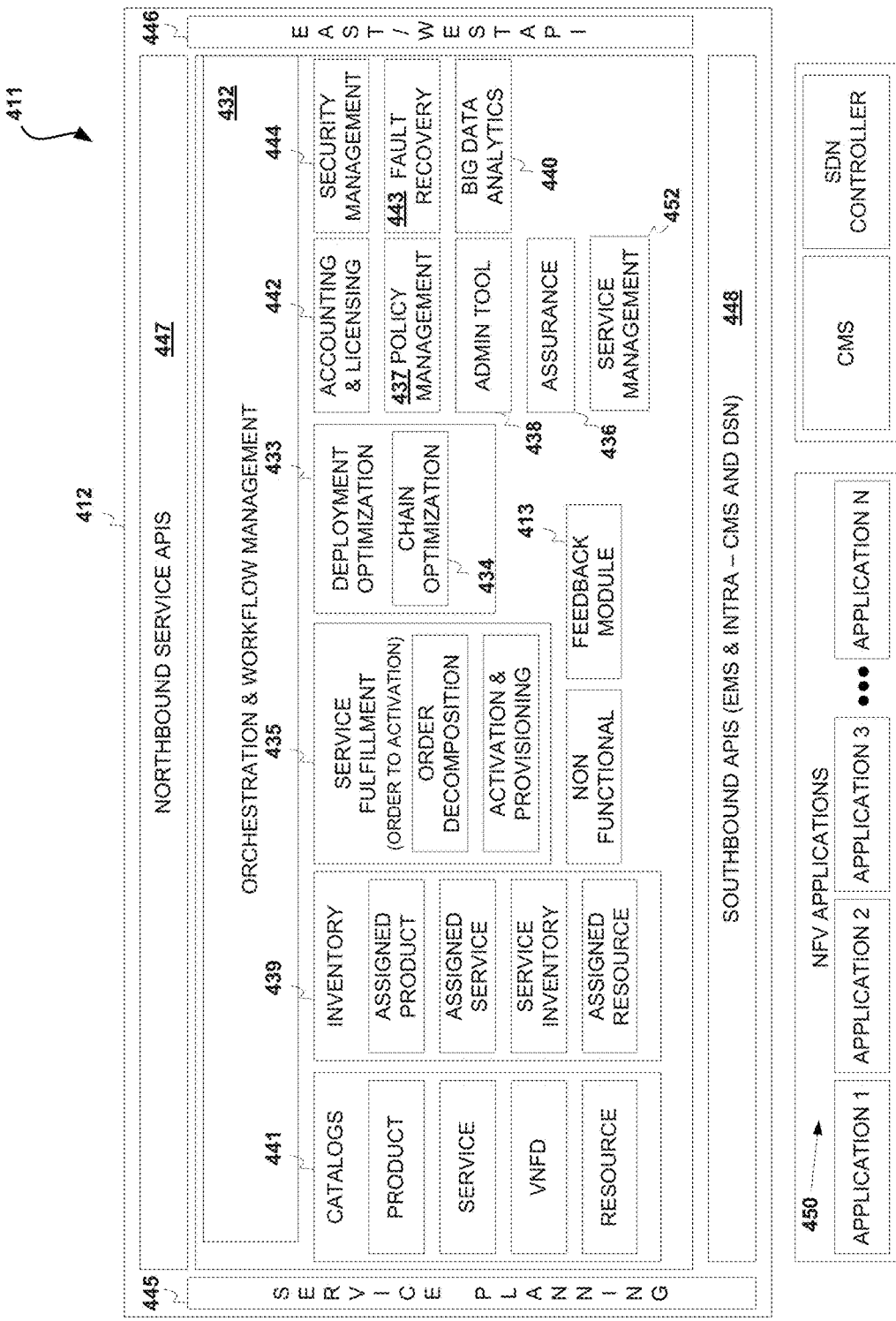
FIG. 4 illustrates a simplified diagram of an NFV management system, in accordance with one embodiment.

FIG. 4 illustrates a simplified diagram of an NFV management system 411, in accordance with one embodiment. As an option, the NFV management system 411 may be implemented in the context of the details of the previous Figures. For example, in one embodiment, the NFV management system 411 may represent the NFV management system 211 of FIG. 2. Of course, however, the NFV management system 411 may be implemented in the context of any desired environment. Further, the aforementioned definitions may equally apply to the description below.

In one embodiment, the NFV management system 411 may include an NFV-O module 412, and a feedback module 413. The NFV management system 411 may include one or more NFV-O modules 412. In various embodiments, each of the NFV-O modules 412 may include orchestration and workflow management 432 that is responsible for managing (i.e. orchestrating) and executing all NFV-O processes, including inbound and/or outbound communication and interfaces.

The NFV management system 411 may include a deployment optimization module 433 that enables a user to devise automatic mechanisms for network optimizations. The deployment optimization module 433 may operate these mechanisms automatically and continuously to optimize the distribution of VNFs 450 and their VNF instances in real-time (or near-real-time) by migrating VNFs 450 and VNF instances (e.g. VNF instances 551 of FIG. 5, etc.) between hardware units (e.g. hardware units 551 of FIG. 5, etc.).

The NFV management system 411 may also include a chain optimization module 434. The chain optimization module 434 may be a part of deployment optimization module 433 and may enable a user to devise automatic mechanisms for optimizing the deployment of chains or groups of VNFs 450 and VNF instances. A service provided by an NFV-based network is typically made of a particular chain or group of particular VNFs 450 and their respective VNF instances. The chain optimization module 434 optimizes the deployment of chains or groups of services between hardware units according to the requirements and specifications associated with and/or adapted to the particular service, or chain, or a group.

The chain optimization module 434 may operate these mechanisms automatically and continuously to optimize in real-time the operation of chains or groups of the VNFs 450 and their VNF instances by re-planning their distribution among hardware units and optionally also by migrating the VNFs 450 and associated VNF instances between hardware units.

The NFV management system 411 may also include a service fulfillment module 435 that manages service and resource (e.g. VNF) instance lifecycle activities as part of the process and orchestration activities. This may include on boarding, initiation (e.g. instantiation), installation and configuration, scaling, termination, software update (e.g. of a running VNF, etc.), test environment, and/or rollback procedure. Additionally, the service fulfillment module 435 may also provide decomposition of an order to multiple network services, and the activation of such network service as a single VNF instance, or as a chain of VNF instances.

Order decomposition includes translating business orders into a network oriented service implementation plan. For example, a business order may be decomposed into a plurality of functions, some of which may be provided by different software programs or modules (e.g. such as various VNFs) instantiated as a plurality of VNF instances across one or more data centers. Performing order decomposition, the service fulfillment module 435 may consult the deployment optimization module 433 for the best deployment option to customer order in a given network and resource condition. Performing order decomposition, the service fulfillment module 435 may then initiate the service including all its components. Order decomposition may be performed in several locations across an NFV-O hierarchy. For example, initial decomposition may be performed in the root of the NFV-O, and then further decomposition may be performed in the relevant data centers.

In one embodiment, an activation and provisioning module may provide the plan for activation and provisioning of the service to the orchestration and workflow management 432. The activation and provisioning module may also provide feedback on fulfillment status to an upper layer. This upper layer may include the business support services (BSS).

The NFV management system 411 may also include an assurance module 436 and a service management module 452 capable of gathering real time data on network elements' status and creating a consolidated view of services and network health. The assurance module 436 includes assurance functionality and may interact with the service management module 452 to perform assurance related lifecycle management procedures. Lifecycle management can be also triggered by other modules, policies, manual intervention, or from the VNFs themselves, etc. The assurance module 436 and the service management module 452 may also trigger events associated with lifecycle management and faults. The assurance module 436 and the service management module 452 may monitor the health of the network and may execute fault recovery activities.

The assurance module 436 and the service management module 452 provide the ability to monitor services' status and performance according to the required criteria. The assurance module 436 and the service management module 452 may also interact with the network infrastructure (e.g. including computing, storage, and networking, etc.) to receive the required information, analyze the information, and act upon each incident according to the defined policy. The assurance module 436 and the service management module 452 are able to interact with analytics to enrich a policy assurance module. Interfaces may also be provided for implementation by an external system.

The NFV management system 411 may also include a policy management module 437 that enables a user to define and configure offline and/or real-time policy for controlling VNF and service related rules. The policy management module 437 may contain the preconfigured policies and activities as well as selection rules for the NFV-O process to determine the preferred policy or activity to be performed for a particular process event. The policy management may be multi-layered, including vendor policy, service policy, and operator policy, etc. The policy mechanism may trigger the suitable policy layer (vendor/service/operator).

The NFV management system 411 may also include an administration module 438 that provides an overall view of the network, manual lifecycle management and intervention, and manual system administration and configuration. The administration module 438 may be operable to enable a user such as an administrator (e.g. administrator 222 of FIG. 2, etc.) to manage, view, and operate the NFV-O system. The administration module 438 may also provide a view of the network topology and services, the ability to perform specific activities such as manual lifecycle management, and changing service and connectivity configuration.

The NFV management system 411 may also include an inventory management module 439 that maintains a distributed view of deployed services and hardware resources. Inventory catalogues may reflect the current instantiation and allocation of the resources and services within the network mapped into products and/or customer entities.

The NFV management system 411 may also include a big data analytics module 440 that analyzes network and service data to support network decisions involving services and subscribers to improve network performance based on actual usage patterns. The big data analytics module 440 may also generate what-if scenarios to support business-oriented planning processes. Additionally, the big data analytics module 440 may function to analyze and evaluate the information for various planning aspects (e.g. Virtual Network Capacity Planning, Data Center Capacity Planning, Value based planning, Cost analysis for network deployment alternatives, etc.), deployment and management (e.g. Guided Operator Recommendations, What-if scenario analysis and simulation, application rapid elasticity and resource usage optimization, etc.), and may support business-oriented planning processes.

The NFV management system 411 may also include a catalog module 441 may include records defining various aspects of the network, such as products, services, and resources such as hardware units and VNFs (e.g. a VNF directory, etc.). The catalog module 441 may include a collection of centralized, hierarchical information repositories containing resource, service and product definitions with their relationship, versioning, and/or descriptors, etc. Such records may include templates enabling a user, such as an administrator, to define particular network components such as resources, products, services, etc. A resource template may define resources descriptors, attributes, activities, procedures, and/or connectivity, etc. A service template may define a service variation from resource building blocks. A product template may define parameters of a sellable product (e.g. prices, rating, etc.) based on service composition (e.g. in one embodiment, this may be part of a BSS catalogue).

The inventory management module 439, the big data analytics module 440, and/or the catalog module 441 may support multiple data centers, multiple CMSs and provide a centralized view across the infrastructure. The inventory management module 439, the big data analytics module 440, and/or the catalog module 441 may also support hybrid networks and services maintaining both physical and virtual resources.

The NFV management system 411 may also include an accounting and licensing module 442 that may be operable to record and manage network software usage data for commercial purposes including licensing, accounting, billing, and reconciliation of services with subscribers and providers. The accounting and licensing module 442 may manage licensing and usage of virtual network applications, including the ability to support complex rating schemes, based on various parameters such as CPU, memory, data, etc. The accounting and licensing module 442 may enable users to define the pricing of particular VNF modules and provide settlement with vendors. The accounting and licensing module 442 may also enable the evaluation of internal costs of services provided within the network for calculating return on investment (ROI).

The NFV management system 411 may also include a fault recovery module 443 (otherwise named disaster recovery planning module or DRP, etc.) that enables a user to plan and manage disaster recovery procedures for the NFV-O and/or the entire network.

The NFV management system 411 may also include a security management module 444 that provides the authentication authorization and accounting services of application security across the network. The security management module 444 may include, for example, an authentication module and function. In one embodiment, the authentication module and function (e.g. including identity management, etc.) may authenticate the identity of each user defined in the system. Each user may have a unique user identity and password. The system may support password based authentication with flexible password policy. Integration with external authentication providers may be done via additional system enhancements. The authorization module and function may support a role-based access control (RBAC) mechanism, where each user is assigned with one or more roles according to the business needs based on the least privileges concept (e.g. standard or administrator roles). In one embodiment, the accounting and licensing module 442 may provide an audit of security events such as authentication or login events.

As an option, the security management module 444 may use rules to protect sensitive information. For example, such rules may be used to ensure the data accessed is used for the specific purposes for which it was collected, sensitive information is encrypted when in storage/transit and masked/truncated on display and logs, and that the entire security system is deployed in the customer's intranet network (i.e. behind network/infrastructure measures), in an independent domain, etc.

In one embodiment, the NFV management system 411 may further include a Secure Development Life Cycle (SDLC) module that ensures that security aspects are handled during a project's life cycle, such as security design, security testing, etc.

As shown further in FIG. 4, the NFV management system 411 may include a service planning module 445. The service planning module 445 may be used by a communication service provider (CSP) sales representative, enterprise, and/or technician, as part of selling engagement process with enterprise/SMB customers.

The service planning module 445 may also provide the ability to interact with catalogues, customer data, network and ordering systems to provide online network service proposals for the enterprise customers with ability to quote update the proposal, validate the serviceability and network inventory, and once done, provide the service order for activation using the northbound interface.

The feedback module 413 may also be part of the NFV-O module 412. The feedback module 413 is operable to receive user input associated with a communication network, determine an impact of the user input on the communication network, and provide feedback indicating the impact of the user input on the communication network. Moreover, the feedback module 413 may be operable to implement the techniques described in the context of FIG. 1.

The NFV management system 411 may also include east/west APIs 446 that include various domains/activities interfaces, including an information source to a big data repository, and interaction capability with a physical network system (OSS).

Northbound APIs 447 provides application programming interfaces (APIs) to various external software packages, such as business support system (BSS) for service order fulfillment, cancel and update activities, status notification, resource inventory view, monitoring system, assurance system, service planning tool, administration tool for system view and configuration, and big data repository, etc.

Further, the southbound APIs 448 may provide APIs for external software packages, such as CMS (including service and VNFs lifecycle activities—receiving from the infrastructure status and monitoring information for upstream system and activities [e.g. assurance]), an SDN Controller (or other connectivity system) to configure inter and intra data center connectivity, an EMS to configure the VNF, and a VNF for a direct configuration.

Figure 5:
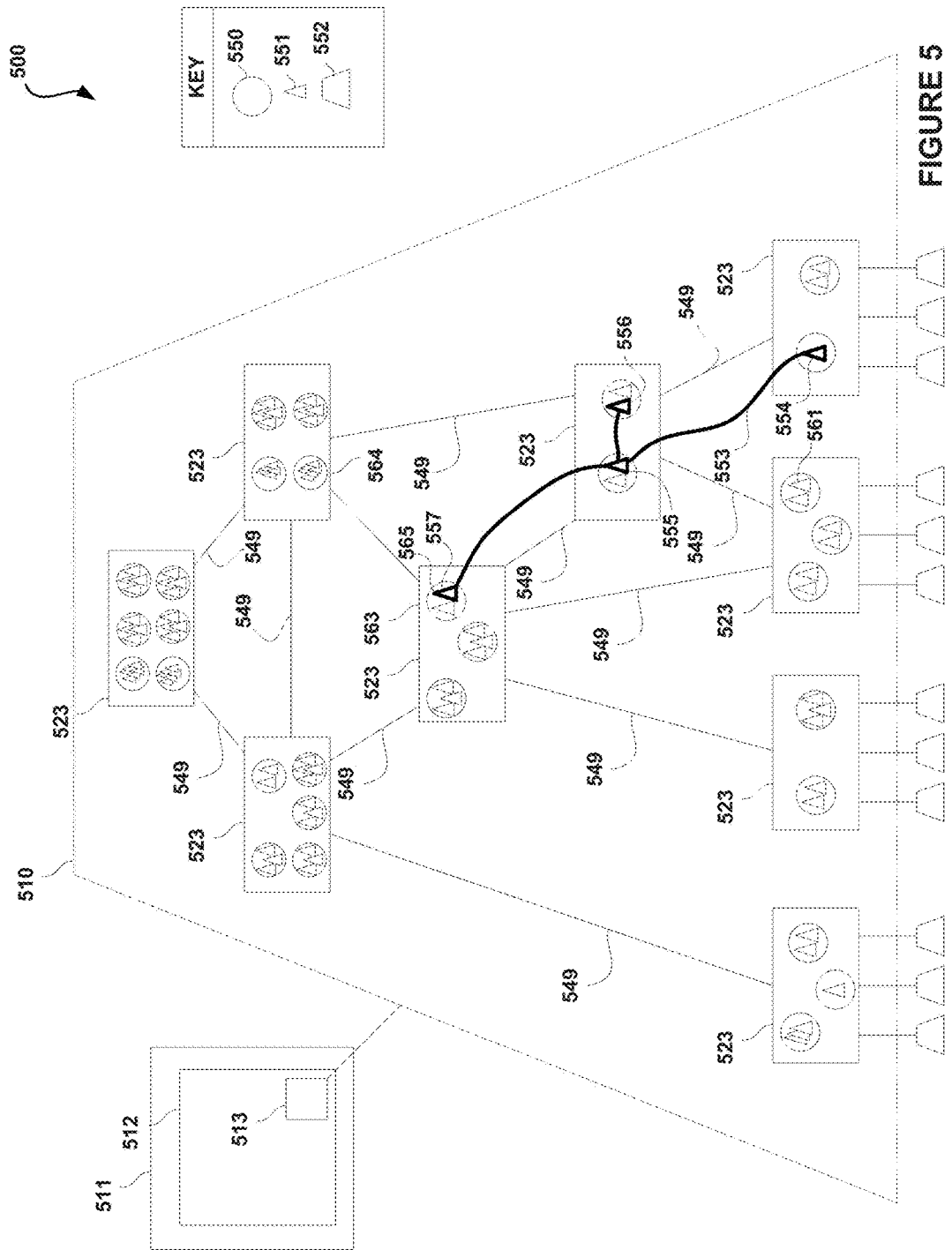
FIG. 5 illustrates a simplified diagram of a deployed NFV-based network, in accordance with one embodiment.

FIG. 5 illustrates a simplified diagram 500 of a deployed NFV-based network 510, in accordance with one embodiment. As an option, the diagram 500 may be viewed in the context of the details of the previous Figures. For example, in one embodiment, the deployed NFV-based network 510 and associated elements may represent the NFV-based networks and associated elements described in the context of the previous Figures. Of course, however, the diagram 500 may be viewed in the context of any desired environment. Further, the aforementioned definitions may equally apply to the description below.

As shown in FIG. 5, the NFV-based network 510 may include hardware units 523 connected via transmission lines 549, and VNFs implemented as software programs 550 installed in hardware units 523. Some of the hardware units 523 may be directly connected to a customer. The customer may be a subscriber, an end-user, or an organization, represented herein as a terminal or a server 552, or a plurality of terminals and/or servers 552. The NFV-based network 510 may also include a NFV management system 511, an NFV-orchestration (NFV-O) 512, and the feedback module 513 (which may all represent elements described in the context of the previous figures, etc.).

As shown further in FIG. 5, several, typically different, VNFs 550 may be installed in the same hardware unit 523. Additionally, the same VNF 550 may be installed in different hardware units 523.

A VNF 550 may be executed by a processor of the hardware unit 523 in the form of a VNF instance 551. Therefore, a particular VNF 550 installed in a particular hardware unit 523 may be "incarnated" in (e.g. initiated, executed as, etc.) any number of VNF instances 551. The VNF instances 551 may be independent of each other. Additionally, each VNF instance 551 may serve different terminals and/or servers 552. The NFV-based network 510 connects to and between communication terminal devices 552 that may be operated by one or more customers, subscribers, and/or end-users.

It is appreciated that a network operator may manage one or more services deployed in the customer's premises. Therefore, some of the hardware units 523 may reside within the premises of the network operator, while other hardware units 523 may reside in the customer's premises. Similarly, a server, such as server computer 216 of FIG. 2, may reside in the premises of the network operator or in the customer's premises. Consequently, when the network operator provides and/or manages one or more services for a customer's terminal devices 552 such as a server computer, the NFV-based network 510 of the network operator may directly manage the VNFs 550, providing the services and their VNF instances 551.

In such situation, the NFV-based network 510 may manage the services irrespectively of the location of the terminal devices 552 (e.g. the server computer 216, etc.), whether in the premises of the network operator or in the customer's premises. In other words, the NFV-based network 510 may be managing the VNFs 550 and the VNF instances 551 providing the services, as well as the terminal devices 552 (e.g. the server computer 216, etc.) being co-located within the same computing device (e.g. the hardware unit 523, etc.), whether in the premises of the network operator or in the customer's premises or in a commercial cloud or any other place.

A service provided by the communication network may be implemented using one or more VNFs. For example, the service may be a group, or a chain of interconnected VNFs. The VNFs making the group, or the service, may be installed and executed by a single processor, by several processors on the same rack, within several racks in the same data-center, or by processors distributed within two or more data-centers. In some cases, chain optimization may be employed by optimizing the deployment of a service in a communication network using network function virtualization, and to optimizing the deployment of a group, or a chain, of virtual network functions in the NFV-based network 510. Therefore, the term "chain optimization" refers to the planning and/or managing of the deployment of VNFs making a chain, or a group, of VNFs providing a particular service.

For example, FIG. 5 shows a first service 553, including the VNFs 550 and their respective VNF instances 554, 555, 556, and 557, and a thick line. In this example, the group or chain of the VNFs 550 making first service 553 are connected as a chain of VNFs 550. However, the VNFs 550 making a service may be connected in any conceivable form such as a star, tree-root, tree-branch, mesh, etc., including combinations thereof. It is noted that the VNFs 550 may be executed by two or more VNF instances 551, such as VNF 554.

The deployment of the group or chain of the VNFs 550 making the first service 553 is therefore limited by constraints such as the capacity of the communication link 549 bandwidth and/or latency (delay).

A VNF may have a list of requirements, or specifications, such as processing power, cash memory capacity, regular memory capacity (e.g. RAM, dynamic, or volatile memory, etc.), non-volatile memory (e.g. such as flash memory, etc.) capacity, storage capacity, power requirements, cooling requirements, etc. A particular VNF instance 551 providing a particular function (e.g. to a particular customer, entity, etc.) may have further requirements, or modified requirements, for example, associated with a particular quality of service (QoS) or service level agreement (SLA). Such requirements may include maximum latency or delay, average latency and maximum variance (latency jitter), maximal allowed packet loss, etc. Other requirements may include service availability, redundancy, backup, provisions for roll-back and/or recovery, fault-tolerance, and/or fail-safe operation, etc.

A service made of a chain or a group of VNFs 550 and their VNF instances 551 may have a similar list of requirements, or specifications, covering the service as a whole. Therefore, such requirements, or specifications, may imply, affect, or include, requirements, or specifications, regarding communication links between the VNFs 550 and/or the VNF instances 551. Such requirements, or specifications, may include bandwidth, latency, bit-error rate, and/or packet loss, etc. Such communication requirements or specifications may further impose deployment limitations, or constraints, requiring particular VNFs 550 and/or VNF instances 551 to reside in the same data-center, or within the same rack, or even in the same computing device, for example, sharing memory or being executed by the same processor. Security measures may add further requirements, or specifications, such as co-location of some of the VNFs 550 and/or the VNF instances 551.

In the context of FIG. 5, the NFV-based network 510 has a hierarchical structure. There may be at least four aspects of the hierarchical structure of the NFV-based network 510. The networking or traffic aspect refers to the arrangement of the transmission lines between the hardware units 523. The processing aspect refers to the arrangement of the hardware units 523. The software aspect refers to the arrangement of the VNFs 550. The operational aspect refers to the arrangement of the VNF instances 551.

One aspect of the optimization process in an NFV-based network is that it may be based on real-time needs, rather than long-term, statistically anticipated, needs. One potential limitation on network reconfiguration in NFV-based networks is that network configuration does not result in a deterioration beyond acceptable level of any of the current services. The NFV deployment module (e.g. module 433 of FIG. 4, etc.) may function to enable and manage migration of services between the hardware units 523, the VNFs 550, and the VNF instances 551 in real-time, without affecting or with a minimal effect on the availability of a service, and while securing service and session continuity.

In the context of the current description, the term "continuous" means that the deployment optimization module and/or a chain optimization module (e.g. the chain optimization module 434 of FIG. 4, etc.) performs the relevant optimization task or process in run-time, or real-time, or online, or on-the-fly, or repetitively and without adversely affecting the network's functionality and its services.

Unlike a legacy network, the NFV-based network may have two topologies: the topology of the hardware devices, and the topology of the VNFs (the distribution of VNFs among the hardware devices). The topology of the hardware network is relatively stable, while the VNF topology can be optimized in real-time. Another benefit of the NFV-based network is that modifying the software topology (e.g. the distribution of VNFs among the hardware devices) is much less costly than any modification of the hardware topology. However, any modification of the network has its cost, including the cost of making such modification possible. Added cost may result from the need to process the modification of the topology and the re-distribution of VNF instances and to maintain excess resources for such purpose.

Thus, in some cases, it may be desired to localize the NFV-O 512, and particularly the deployment optimization processes associated with the deployment optimization module and the chain optimization module to reduce the cost, and simultaneously to secure the possibility to expand the scope of the network managed by these processes, if needed.

As previously noted, complex systems such as NFV-based communication networks are governed in very complex ways. Software uses pattern matching, rules, and historical data to optimize its behavior. For example, when traffic increases, the system may need to purchase additional resources, such as machines on the cloud or more bandwidth.

In some cases, decisions may be based on pattern matching, in which detecting a pattern may suggest an action. In other cases, the decisions may be based on thresholds, such as when specific load is detected, some action is taken. Decisions may also be based on rules such as what to do in the morning or evening depending on cloud cost structure and on predictions based on historical data that suggests, for example, what to do in specific time of the month or the day.

In many such complex systems/networks, administrators can personally give feedbacks or directives to the system/network. The direction may be very direct, such as a directive to buy more systems, or move cloud providers, etc. The feedback may be less direct, to be used in conjunction with other observations, such as to expect certain loads, expect DOS attacks, inform of price changes, suggesting configurations, etc.

In the context of NFV-based communication networks, an administrator may order to scale out a service, however, the service may have scaled out regardless, for a particular reason (e.g. an overloaded CPU, etc.). As another example, if an administrator has an input on a storm that is expected to hit in a first city, the administrator may indicate a preference of systems in a second city to handle services from systems in the first city. If there is a power outage, the administrator may indicate a preference for using systems in a third city (or center) for specific services and to use the power generator for others, etc.

As another example, an administrator may change service priority, such that one service is preferred over another service (e.g. this may affect the resources that each service can allocate, etc.).

Additionally, the administrator may want to change values in an application level, such as increasing a sensitivity of a security parameter. As the administrator cannot change the application values, it may change an indicator (e.g. in this case expect threat).

The system/network may take the user suggestions and direction together with its own pattern matching, rules, thresholds and other controls and decide based on all of that criteria what to do.

It may be far from trivial for the user to understand how directives impacted the system. However, a special case of specific importance is for the user to know if the directives had no impact. Also, it is desirable that the user is able to determine how a directive impacted a KPI. It is also desirable for the user to determine the best time to give a directive to have the best impact on the KPI.

Thus, it is desirable to give the user feedback on how specific directives impacted the system/network, as well as on what alternative directives the user could have given. Impact in this case refers to the difference in actions and in KPIs due to user feedback compared to the user not giving the feedback. For example, the user actions may have been to give a warning that more traffic is coming soon, or that the system is under DDOS attack. It could be that under the specific situation the user has given feedback, but the system would have been working the same with or without the user actions, and it could improve or worsen the KPI.

Accordingly, it is desirable to provide the user feedback on the usefulness of the directives on associated historical data (or other historical data). It is also desirable to explain to the user how user feedback impacted the system. This is useful, as the feedback will indicate how to better interact with the system in the future.

For implementing such techniques, in one embodiment, a scenario may be executed. When the user starts entering feedback (e.g. giving at least one directive, etc.), two scenarios may be initiated to run in parallel, one with the user directives and one without the directives. A user interface may be presented to the user showing the KPIs for both scenarios, marking the places where differences are caused as a result of the directives.

If the user provided only one feedback, then all changes in the parallel run scenarios are due to that feedback. If the user had multiple feedbacks, then it is more difficult to tell which feedback the different performance is to be attributed, unless the simulation is forked at each decision point.

At any point the user may decide to designate one of the two branches representing the scenarios as the main branch. This is useful as now the user may see how new directives impact the system and the user can see that it is the impact of the new directives and not of the old directives.

For example, if at time X the user decides to continue from the branch with given directives, at time X+1 the user gave a new directive, and at time X+2 the KPIs are different, the user knows they are different because of the directives the user gave at time X+1 and not due to earlier directives.

Figure 6:
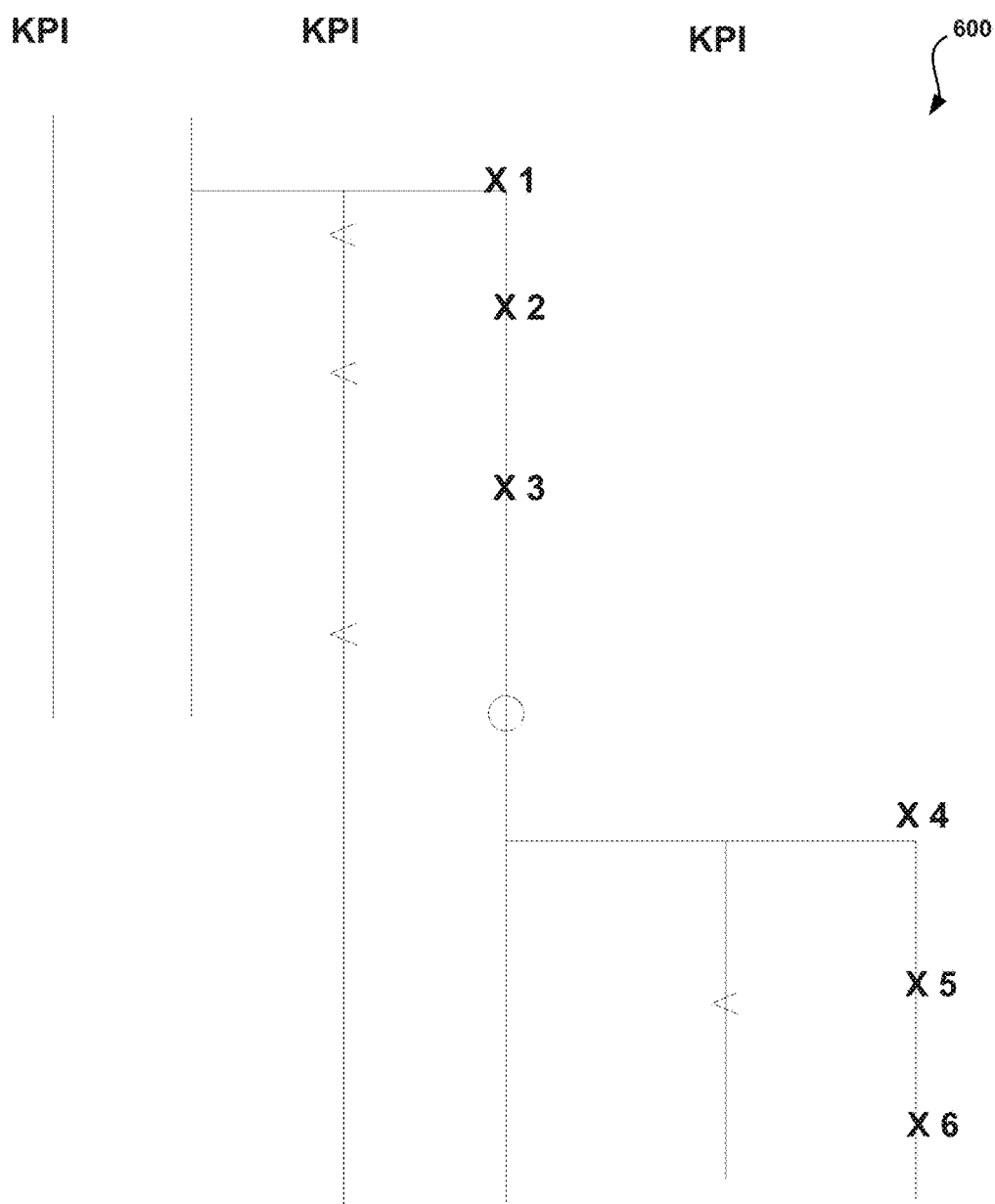
FIG. 6 illustrates a schematic of a user interface screen providing feedback to a user, in accordance with one embodiment.

FIG. 6 illustrates a schematic 600 of a user interface screen providing feedback to a user, in accordance with one embodiment. As an option, the schematic 600 may be viewed in the context of the details of the previous Figures. Of course, however, the schematic 600 may be viewed in the context of any desired environment. Further, the aforementioned definitions may equally apply to the description below.

As shown in FIG. 6, while the system is simulated, the user takes six actions marked x1 through x6. After the user takes the first action, two parallel simulations exist, one with the impact of the user action and one without the impact. The forking is created when the user takes action x1.

Each of the two simulations, with the user input and without the user input, has an associated KPI next to it. The schematic 600 marks in relevant places the location that the user should look and compare the KPI using '<'. After a while, the user may desire the next actions to be compared on their own merits. Thus, using the user interface, the user may place an 'O' on the scenario, in this case on the stream that uses the user actions. This makes it the main simulation stream and kills the other scenario. The next user action, x4 starts a new fork. The user may indicate that a particular scenario with the user's feedback is the scenario from which to continue. This may be accomplished by placing the 'O', but could be done in any other way utilizing the user interface.

In an alternative implementation the user could, when the user creates an action, decide to which of the two streams it applies (or to both).

Figure 7:
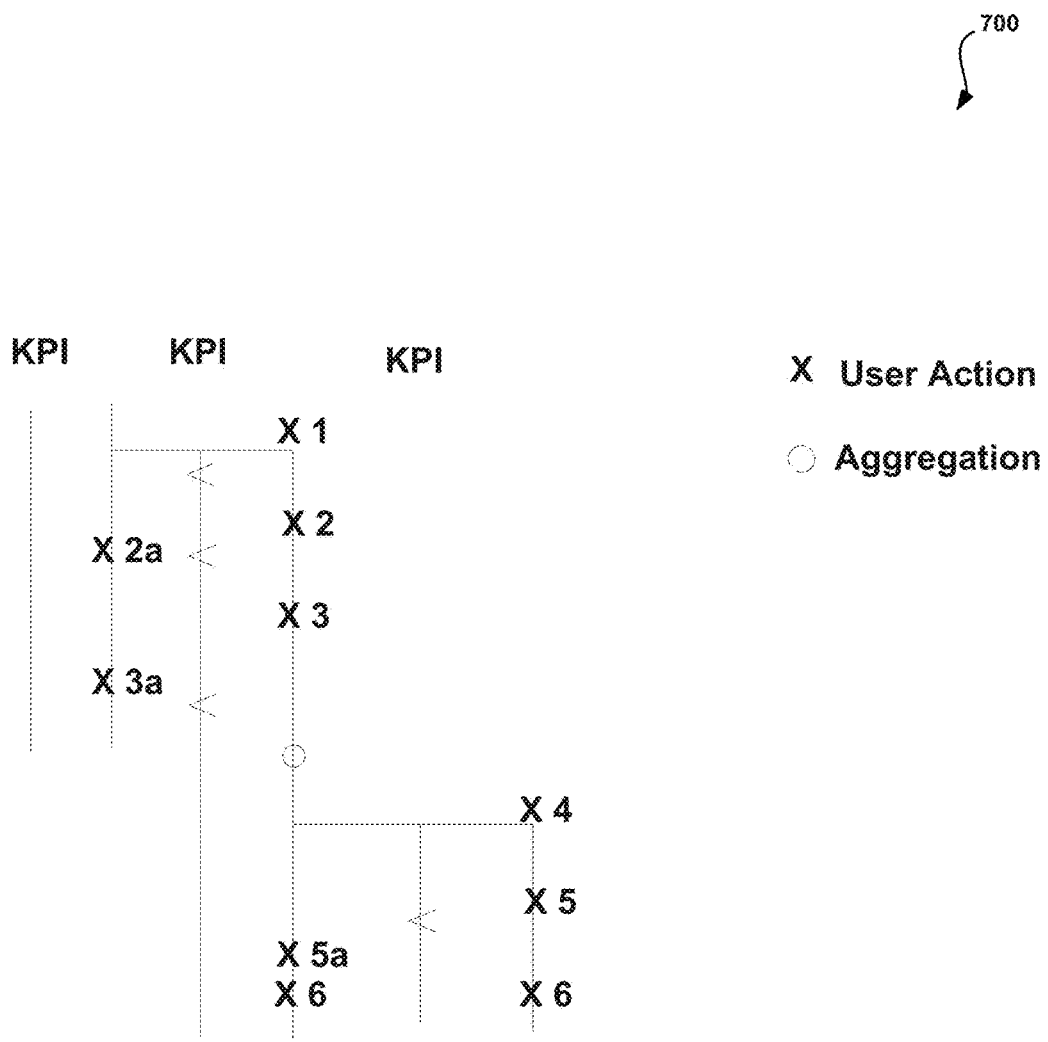
FIG. 7 illustrates a schematic of a user interface screen providing feedback to a user, in accordance with another embodiment.

FIG. 7 illustrates a schematic 700 of a user interface screen providing feedback to a user, in accordance with another embodiment. As an option, the schematic 700 may be viewed in the context of the details of the previous Figures. Of course, however, the schematic 700 may be viewed in the context of any desired environment. Further, the aforementioned definitions may equally apply to the description below.

As shown in FIG. 7, the first stream has the actions x2a (alternative as not done on the main stream) and x3a. A second stream has the actions x1, x2, x3, x5a and x6 (done on both second and third streams). A third stream has the actions x4, x5, and x6.

This enables the user to compare the result of an action not only to taking no action but also to taking alternative actions. The KPI remains the same as in the previous configuration.

Another implementation, not requiring the ability to fork, is to start from the beginning and run a number of simulations, each time taking different actions and comparing the simulations to each other (with the KPIs). This may be performed as many times as desired.

Figure 8:
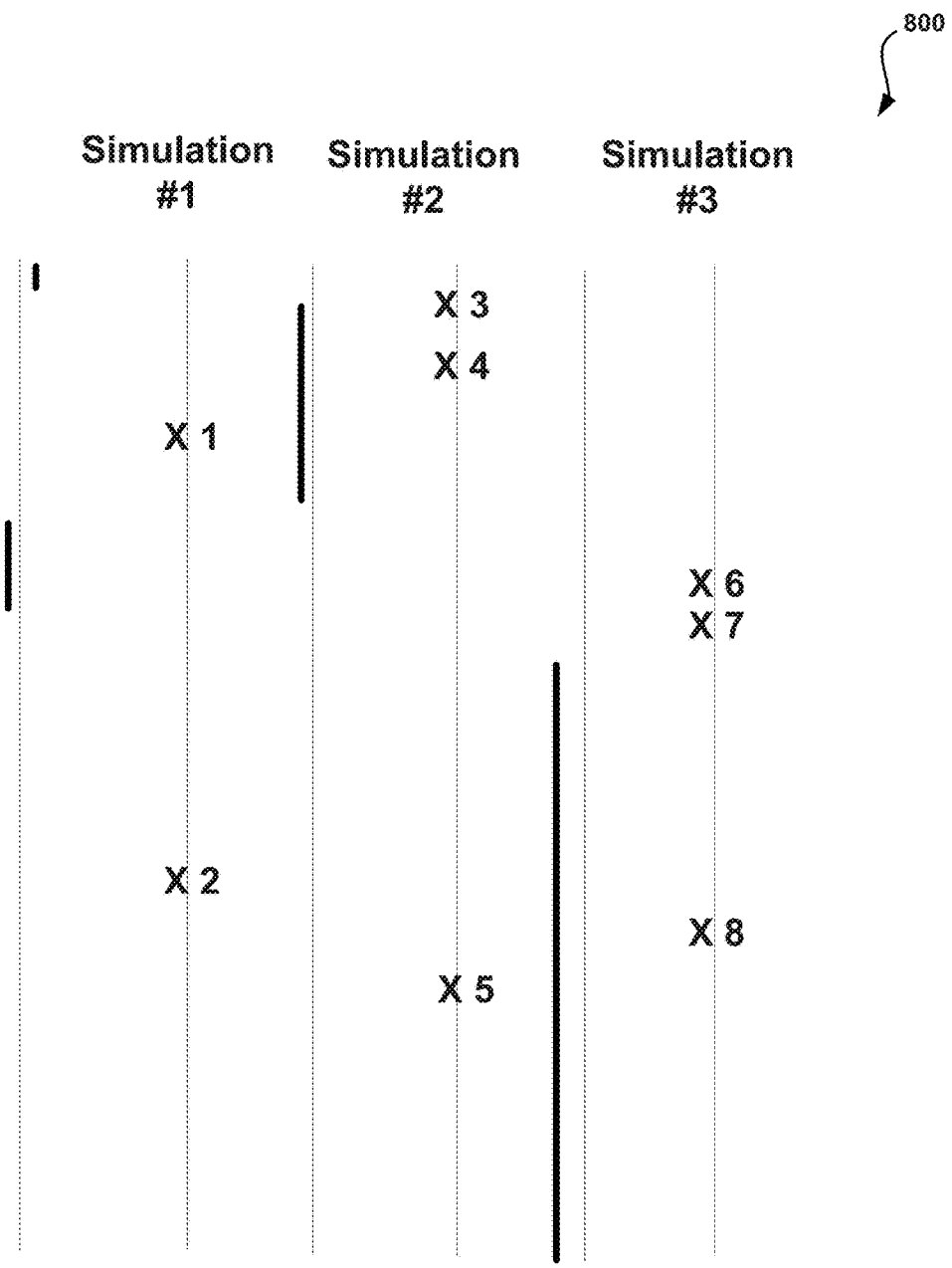
FIG. 8 illustrates a schematic of a user interface screen providing feedback to a user, in accordance with another embodiment.

FIG. 8 illustrates a schematic 800 of a user interface screen providing feedback to a user, in accordance with another embodiment. As an option, the schematic 800 may be viewed in the context of the details of the previous Figures. Of course, however, the schematic 800 may be viewed in the context of any desired environment. Further, the aforementioned definitions may equally apply to the description below.

As shown in FIG. 8, three simulations with different user actions are compared. The dark bolded lines mark an example of a user interface that shows the user where the best KPI values are located.

As previously indicated, it is also desirable to indicate to the user that the directives had no impact or caused no action. Causing no action indicates that the same action will be taken regardless of whether the user gave a specific feedback/input or not (for a specific state and historical traffic). For example, the user actions may have been to give a warning that more traffic is coming soon, or that the system is under DDoS attack. However, it could be that under the specific situation the user has given this feedback, the system would have been working the same with or without the user input. This could be either because the same things were detected independently by the system, or alternatively that in this situation there was nothing useful that the system could do with this input.

Accordingly, it is desirable to give the user feedback on the usefulness of directives, both in training what-if scenarios, and on historical data. It is also desirable to indicate to the user which feedback given made no difference to the system. This is useful, as it will indicate to the user what happens in practice as well as indicating when feedback is useful.

A user feedback has no impact if the actions of the system are the same with or without the user feedback. Thus, training what-if scenarios may be accomplished. For example, there is a state of the system, the user decides to give some feedback, it is determined what the system does with the feedback and without the feedback. If it is the same, the user is told that the action/input had no impact.

One technique that may be used to implement this is to run a scenario twice, once with user feedback/input and once without the user input. This works well for a single feedback. For a longer scenario, in which the user gives multiple directives, an iterative solution may be implemented.

For example, for each user directive, the system may be continuously run in parallel, one scenario where the directive was given and one scenario in which the directive was not given. This may be continued until a change is detected or until the end of the what-if scenario. Thus, if the user gives thirty directives, at most thirty-one scenarios may be run in parallel. Thirty-one scenarios need to be run in parallel only if none of the user directives has any impact until the end the simulation (which is very unlikely). This requires the ability to fork the simulation, which is fairly common. If no impact was detected until the end of simulation, then it may be assumed these actions had no impact.

Figure 9:
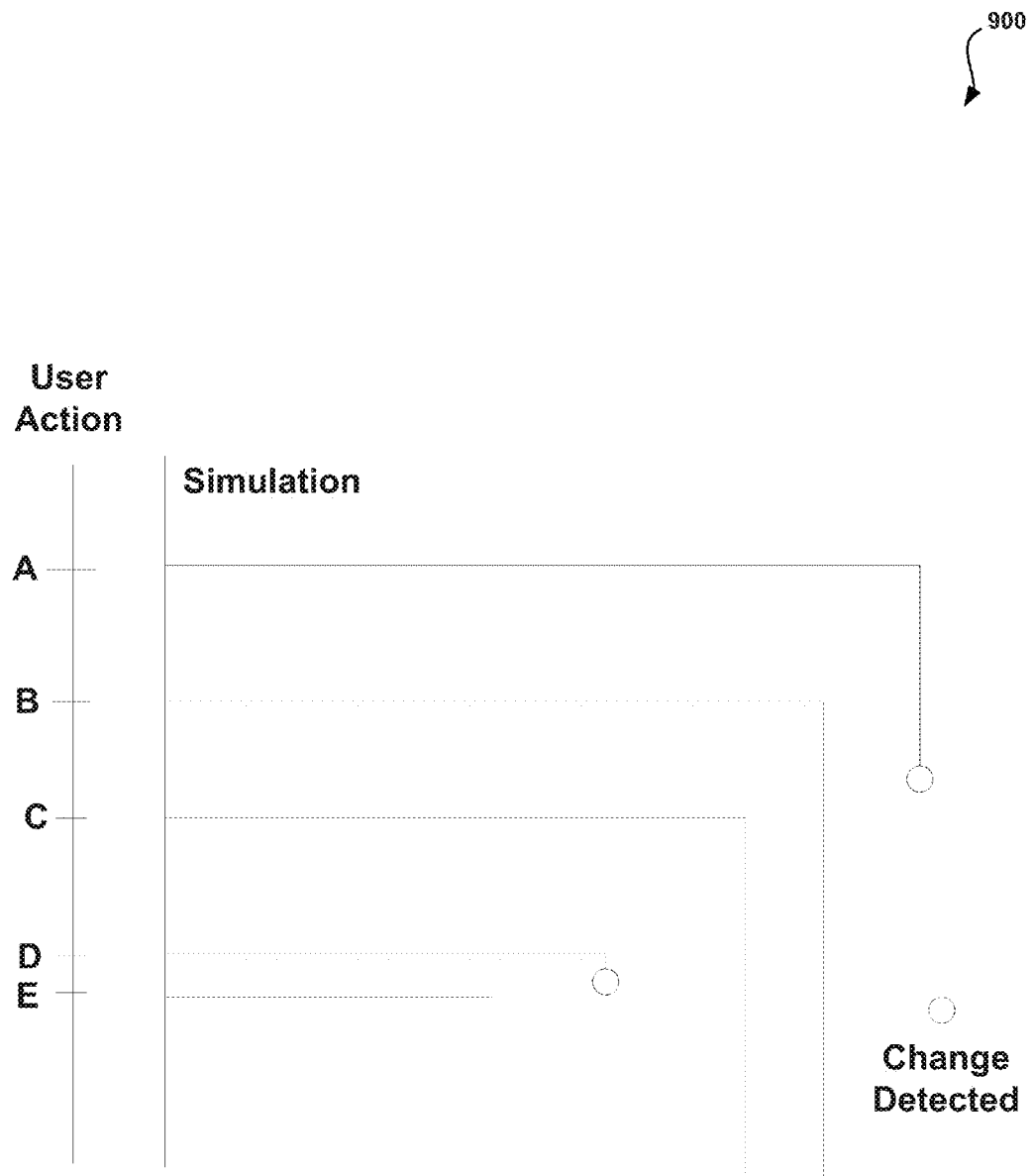
FIG. 9 illustrates a schematic of a user interface screen providing feedback to a user, in accordance with another embodiment.

FIG. 9 illustrates a schematic 900 of a user interface screen providing feedback to a user, in accordance with another embodiment. As an option, the schematic 900 may be viewed in the context of the details of the previous Figures. Of course, however, the schematic 900 may be viewed in the context of any desired environment. Further, the aforementioned definitions may equally apply to the description below.

As shown in FIG. 9, the user makes five actions A, B, C, D, and E resulting in six simulation streams. Both A and D have impacts and the others do not. The number of concurrent simulations at the end is the number of actions with no impact +1 for the original stream. The number of concurrent simulation may be equal to the number of actions +1 (even if they had impact) as the impact may be detected after the split.

In this case, it needs to be decided if the fork is with the user change (meaning the main branch is without user changes) or without, meaning the main branch has the user changes.

Another technique is utilizing a log of historical data. In this case, all inputs may be logged as well as the user actions. The system may then be executed in replay mode, either with a specific user action or without the specific user action and the behavior may be observed. If the streams/scenarios are the same, then the user action had no impact.

While this approach will work, the processing required may not be desirable. For example, this requires a user to rerun the entire system, repeating for each user action. This is similar to the scenario described in the context of FIG. 9 but also requires a capture replay capability, which may be expensive.

Another option is to use a partial log and a partial simulation. For example, there may be a log not of everything but just of the load. As an example, the user action in question may be starting more machines. The rule may be, if there is no user action, to start the machine when the threshold reaches 75% load. When it goes below 50%, the system may release the machines.

Thus, looking at the partial log, a system may simulate how the algorithm would have worked with or without user intervention and can determine whether the directive of the user has any consequences. The partial log that needs to be maintained depends on the user directives. Most user actions are related to statistics on the traffic, not to the traffic itself. Maintaining a log of statistics require a lot less information. One potential issue is that the simulation cannot be done with the original software so simulation software may be needed. This may exist for what-if scenarios and will certainly be useful. The original software may also be used with additional software that takes the log of the statistics and creates input that implements the statistics.

Another option is measuring in the code whenever there is a user action, or an input from the user is considered. This may be the most efficient way and the two options of checking whether the state changes or whether it impact the outcome can performed similar to mutations testing. It will give the user fairly real time (soft) feedback as to what the actions achieved. The feedback may include information associated with what the action achieved, what would have been the result without the user directive, and what it is with the user directive. This may require changes to the code, however.

Another implementation, which is related to the forking mechanism, is to fork each time the user inputs. Thus, if there are three input the result may be a tree as shown in FIG. 10.

Figure 10:
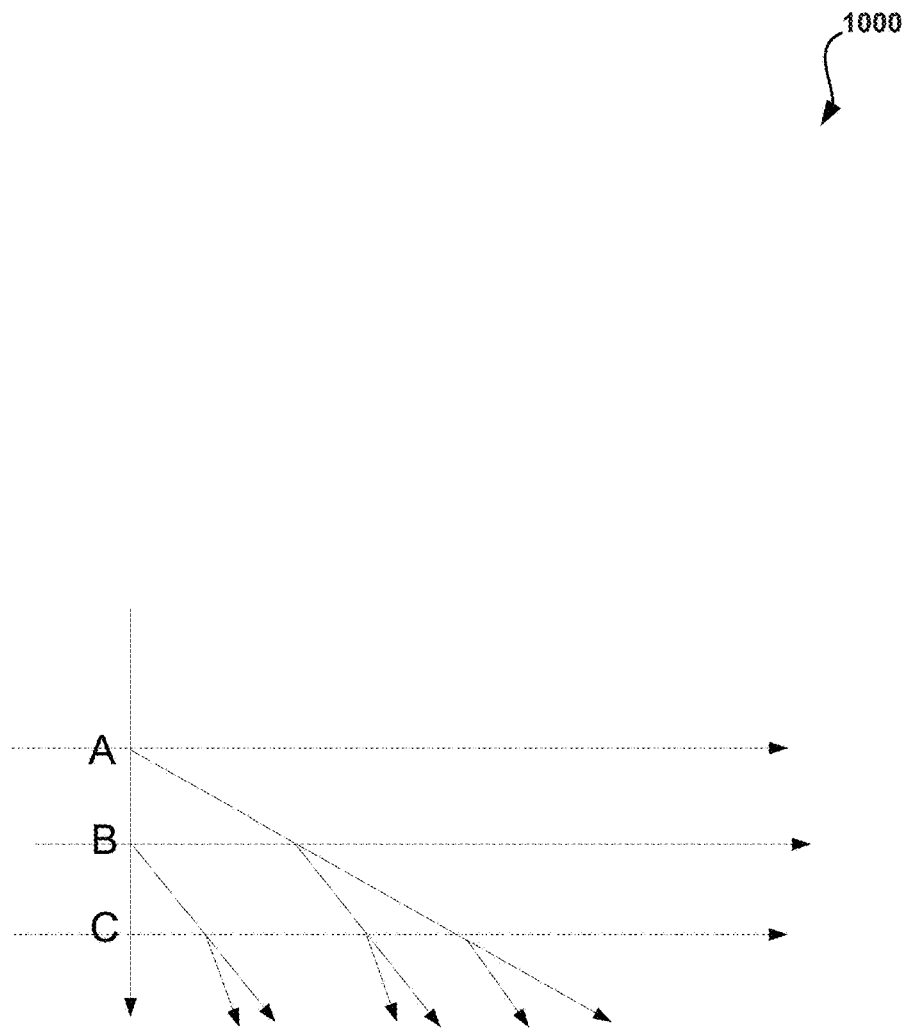
FIG. 10 illustrates a schematic of a user interface screen providing feedback to a user, in accordance with another embodiment.

FIG. 10 illustrates a schematic 1000 of a user interface screen providing feedback to a user, in accordance with another embodiment. As an option, the schematic 1000 may be viewed in the context of the details of the previous Figures. Of course, however, the schematic 1000 may be viewed in the context of any desired environment. Further, the aforementioned definitions may equally apply to the description below.

In one embodiment, processing may stop at each branch when a difference is identified.

When determining whether there is an impact to a network/system, the impact of the change may be tested in two layers: an orchestrator view (e.g. BW, number of virtual machines, storage, etc.), and a service view (the internal state of the service).

It could be that there was a change in the service view that will never make it to the orchestrator view, but it is cheaper the faster the change is found. This is a similar tradeoff to that of mutation testing. The earlier it is determined there was an impact, the fewer simulations needed.

It should be noted that the user/administrator who is using the techniques described herein may include a CSP administrator or a customer administrator (e.g., the CIO, etc.), etc.

Figure 11:
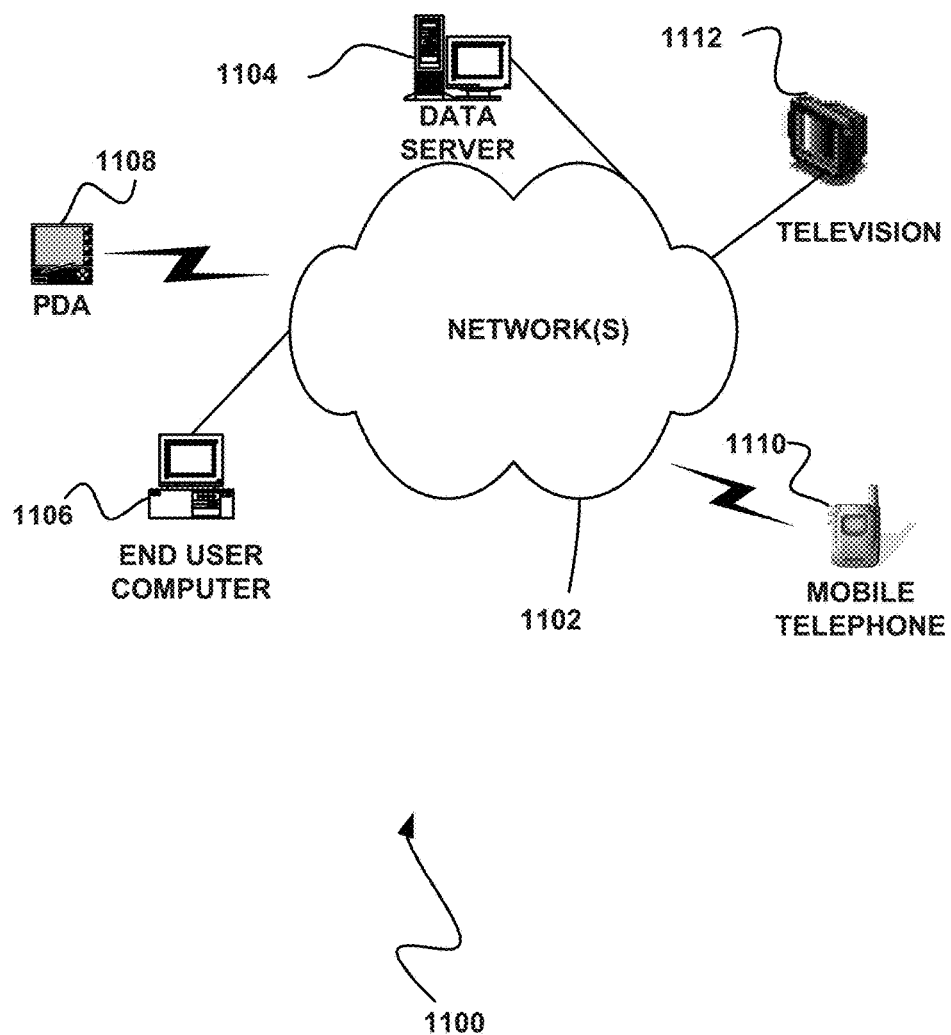
FIG. 11 illustrates a network architecture, in accordance with one possible embodiment.

FIG. 11 illustrates a network architecture 1100, in accordance with one possible embodiment. As shown, at least one network 1102 is provided. In the context of the present network architecture 1100, the network 1102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 1102 may be provided.

Coupled to the network 1102 is a plurality of devices. For example, a server computer 1104 and an end user computer 1106 may be coupled to the network 1102 for communication purposes. Such end user computer 1106 may include a desktop computer, lap-top computer, and/or any other type of logic. Still yet, various other devices may be coupled to the network 1102 including a personal digital assistant (PDA) device 1108, a mobile phone device 1110, a television 1112, etc.

Figure 12:
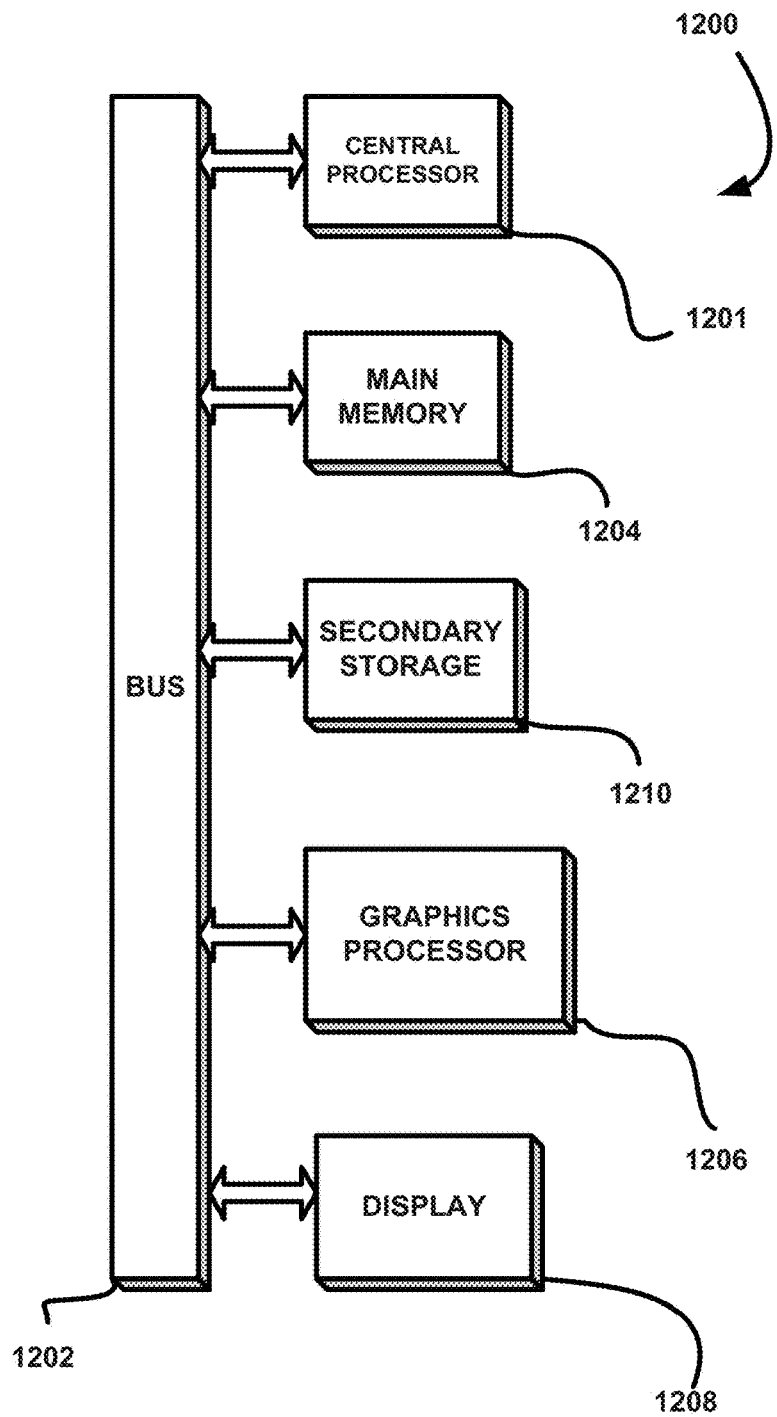
FIG. 12 illustrates an exemplary system, in accordance with one embodiment.

FIG. 12 illustrates an exemplary system 1200, in accordance with one embodiment. As an option, the system 1200 may be implemented in the context of any of the devices of the network architecture 1100 of FIG. 11. Of course, the system 1200 may be implemented in any desired environment.

As shown, a system 1200 is provided including at least one central processor 1201 which is connected to a communication bus 1202. The system 1200 also includes main memory 1204 [e.g. random access memory (RAM), etc.]. The system 1200 also includes a graphics processor 1206 and a display 1208.

The system 1200 may also include a secondary storage 1210. The secondary storage 1210 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 1204, the secondary storage 1210, and/or any other memory, for that matter. Such computer programs, when executed, enable the system 1200 to perform various functions (as set forth above, for example). Memory 1204, storage 1210 and/or any other storage are possible examples of tangible computer-readable media.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product embodied on a non-transitory computer readable medium, comprising:
computer code for receiving user input associated with a network system, the user input including directives for a configuration or operation of the network system;
computer code, responsive to receiving the user input, for:
executing at least one first scenario, during simulation of the network system, utilizing the user input to determine a first result for the network system, and
executing at least one second scenario, during the simulation of the network system, without utilizing the user input to determine a second result for the network system;
computer code for determining an impact of the user input on the network system including locations in the network system where differences in key performance indicators (KPIs) occur as a result of the user input, by comparing the first result and the second result;
computer code for providing feedback indicating the impact of the user input on the network system, the feedback indicating one of:
that there are no locations in the network system where differences in KPIs occur as a result of the user input, or
the locations in the network system where differences in KPIs occur result of the user input; and
computer code for automatically optimizing the network system, based on:
the impact of the user input on the network system, and at least one of: pattern matching, rules, or historical data.

2. The computer program product of claim 1, wherein the network system is a network function virtualization (NFV)-based network system, and wherein the first result and the second result are compared at a first level relating to an orchestrator view of the network system and at a second level relating to a service view of the network system.

3. The computer program product of claim 2, wherein the orchestrator view includes a number of virtual machines and storage, and wherein the service view includes an internal state of a service.

4. The computer program product of claim 1, wherein the user input includes directives for the configuration of the network system.

5. The computer program product of claim 4, wherein the user input includes directives to scale out a service.

6. The computer program product of claim 1, wherein the user input includes directives for the operation of the network system.

7. The computer program product of claim 6, wherein the user input includes directives to change a priority between two services, which affects resources that each of the two services can allocate.

8. The computer program product of claim 1, wherein the at least one first scenario and the at least one second scenario are executed in parallel.

9. The computer program product of claim 1, wherein the computer program product is operable such that when additional user input associated with the network system is received, at least one third scenario implementing the additional user input is created and is run in parallel with the at least one first scenario and the at least one second scenario.

10. A method, comprising:
receiving user input associated with a network system, the user input including directives for a configuration or operation of the network system;
responsive to receiving the user input:
executing at least one first scenario, during simulation of the network system, utilizing the user input to determine a first result for the network system, and
executing at least one second scenario, during the simulation of the network system, without utilizing the user input to determine a second result for the network system;
determining an impact of the user input on the network system including locations in the network system where differences in key performance indicators (KPIs) occur as a result of the user input, by comparing the first result and the second result;
providing feedback indicating the impact of the user input on the network system, the feedback indicating one of:
that there are no locations in the network system where differences in KPIs occur as a result of the user input, or
the locations in the network system where differences in KPIs occur result of the user input; and
automatically optimizing the network system, based on:
the impact of the user input on the network system, and
at least one of: pattern matching, rules, or historical data.

11. A system comprising:
a memory system; and
one or more processing cores coupled to the memory system and that are each configured to:
receive user input associated with a network system, the user input including directives for a configuration or operation of the network system;
responsive to receiving the user input:
execute at least one first scenario, during simulation of the network system, utilizing the user input to determine a first result for the network system, and
execute at least one second scenario, during the simulation of the network system, without utilizing the user input to determine a second result for the network system;
determine an impact of the user input on the network system including locations in the network system where differences in key performance indicators (KPIs) occur as a result of the user input, by comparing the first result and the second result;
provide feedback indicating the impact of the user input on the network system, the feedback indicating one of:
that there are no locations in the network system where differences in KPIs occur as a result of the user input, or
the locations in the network system where differences in KPIs occur result of the user input; and
automatically optimize the network system, based on:
the impact of the user input on the network system, and
at least one of: pattern matching, rules, or historical data.

* * * * *